United States Patent
Thagard et al.

(10) Patent No.: US 6,215,737 B1
(45) Date of Patent: Apr. 10, 2001

(54) USING DIFFERENT SAMPLING RATES TO RECORD MULTI-CHANNEL DIGITAL AUDIO ON A RECORDING MEDIUM AND PLAYING BACK SUCH DIGITAL AUDIO

(75) Inventors: Gregory Thagard, Encino; Alan McPherson, Burbank, both of CA (US); Charles M. J. Mecca, Jessup, PA (US); Edwin Outwater, III, Santa Monica; George Lydecker, Burbank, both of CA (US)

(73) Assignee: WEA Manufacturing, Inc., Olyphant, PA (US)

( * ) Notice: Subject to any disclaimer, the term of this patent is extended or adjusted under 35 U.S.C. 154(b) by 0 days.

(21) Appl. No.: 09/066,043

(22) Filed: Apr. 24, 1998

Related U.S. Application Data

(60) Provisional application No. 60/045,598, filed on May 5, 1997, provisional application No. 60/045,599, filed on May 5, 1997, and provisional application No. 60/045,878, filed on May 5, 1997.

(51) Int. Cl.[7] .............................. H04B 1/20; G11B 5/09
(52) U.S. Cl. ............................ 369/4; 369/48; 369/49; 369/275.3; 386/104; 364/400.01; 381/22
(58) Field of Search ........................... 369/4, 9, 47, 48, 369/275.3, 124, 89, 59; 360/32; 386/104; 364/400.01; 381/18, 22, 24

(56) References Cited

U.S. PATENT DOCUMENTS

| | | | |
|---|---|---|---|
| 4,636,876 | * 1/1987 | Schwartz | 360/32 |
| 4,941,177 | * 7/1990 | Mandell et al. | 381/22 |
| 5,136,650 | * 8/1992 | Griesinger | 381/22 |
| 5,365,468 | 11/1994 | Kakubo et al. | 364/724.1 |
| 5,398,029 | 3/1995 | Toyama et al. | 341/61 |
| 5,506,907 | * 4/1996 | Ueno et al. | 381/18 |
| 5,533,129 | * 7/1996 | Gefvert | 381/24 |
| 5,539,716 | 7/1996 | Furuhashi | 369/59 |
| 5,570,308 | 10/1996 | Ochi | 364/724.1 |
| 5,638,451 | 6/1997 | Sedlmeyer | 381/2 |
| 5,644,507 | * 7/1997 | Ostrover et al. | 386/125 |
| 5,727,068 | * 3/1998 | Karagosian | 381/22 |
| 5,748,835 | * 5/1998 | Lee | 386/104 |
| 5,844,513 | * 12/1998 | Nishio | 341/143 |

FOREIGN PATENT DOCUMENTS

| | | | |
|---|---|---|---|
| 0 381 807 A2 | 8/1990 | (EP) | G11B/20/10 |
| 0 734 019 A1 | 9/1996 | (EP) | G11B/20/10 |
| 6-215483 | 5/1994 | (JP) | G11B/20/10 |
| WO 95/21491 | 8/1995 | (WO) | H03M/7/30 |

OTHER PUBLICATIONS

"Compact Disc mit gemultiplexten Informationskanälen", Neues aus der Technik, Feb. 20, 1987.

* cited by examiner

Primary Examiner—John W. Cabeca
Assistant Examiner—Kim-Kwok Chu
(74) Attorney, Agent, or Firm—Fish & Neave; Robert R. Jackson; Douglas A. Cardwell

(57) ABSTRACT

Methods and apparatus for recording and playing back multi-channel digital audio having different sampling rates for different channels are provided. Recording is accomplished by sampling a plurality of channels of audio data and arranging the samples of the plurality of channels of audio data in most nearly the order needed during playback. Playback is accomplished by accessing the samples of the plurality of channels of audio data and converting the samples from digital to analog form. The playback may include deriving audio signals in a different format from the format in which the programming is recorded.

14 Claims, 6 Drawing Sheets

| | |
|---|---|
| CHANNEL 1 DATA | RESOLUTION 1 |
| CHANNEL 2 DATA | RESOLUTION 2 |
| CHANNEL 3 DATA | RESOLUTION 3 |
| | |
| | |
| | |
| CHANNEL N DATA | RESOLUTION K |

FIG. 1

USING DIFFERENT SAMPLING RATES TO RECORD MULTI-CHANNEL DIGITAL AUDIO ON A RECORDING MEDIUM AND PLAYING BACK SUCH DIGITAL AUDIO

CROSS-REFERENCES TO RELATED APPLICATIONS

This application claims the benefit of United States provisional patent applications Nos. 60/045,598, 60/045,599, and 60/045,878, all filed May 5, 1997.

BACKGROUND OF THE INVENTION

This invention relates to recording and playback of multi-channel digital audio having different sampling rates for different channels.

Commonly assigned McPherson et al. U.S. patent application Ser. No. 09/066,042, filed Apr. 24, 1998 and McPherson et al. U.S. patent application Ser. No. 09/066,041, filed Apr. 24, 1998 are incorporated herein by reference.

Technology of the type used for software carriers such as the Digital Versatile Disc ("DVD") makes it economically viable to provide recording media containing greatly enhanced audio information. For example, it is possible to provide digital audio recordings on software carriers having six channels of digital audio to be played by six-channel audio systems. The typical six-channel audio system has a front left channel, a front center channel, a front right channel, a rear left channel, a rear right channel, and a subwoofer (low frequency effect, "LFE") channel.

It is known that increased sampling rates provide better audio reproduction. However, sampling all channels of multi-channel audio at very high rates may produce more data and take up more space on the software carrier than is necessary to produce better reproduction. In addition, many potential purchasers of audio software carriers may have only two-channel stereophonic audio systems, and it may be wasteful of space on the software carrier to record the same audio programming in both six-channel and two-channel versions, especially when higher sampling rates are to be used to enhance audio reproduction quality.

In view of the foregoing, it is an object of this invention to provide methods and apparatus for recording and playing back multi-channel digital audio having different sampling rates for different channels in order to avoid recording more data than is necessary and consequently to conserve space on the software carrier.

It is another object of this invention to provide methods and apparatus for deriving from audio information recorded and played back in one format audio signals in a different format so that both formats do not have to be recorded on the software carrier.

SUMMARY OF THE INVENTION

This and other objects of the invention are accomplished by providing methods and apparatus for recording by sampling a plurality of channels of audio data such that at least two channels of the plurality of channels are sampled at different rates and bit depths. In addition, the samples of the plurality of channels of audio data are preferably arranged on the software carrier in a single sequence in which the samples are in most nearly the order that they will be needed during playback. Methods and apparatus for playing back are also provided which access the multi-channel samples, taken at different rates for different channels and interleaved into a single stream as described above, and reconstruct the multi-channel analog audio information from those samples. In addition, the playback methods and apparatus may include deriving another version of the audio information from the information retrieved from the software carrier. For example, two-channel stereophonic audio signals may be derived from six-channel audio information retrieved from the software carrier, and various weighting factors may be used for combining information from various ones of the six channels to produce the signals for each of the two stereophonic channels.

Further features of the invention, its nature and various advantages will be more apparent from the accompanying drawings and the following detailed description of the preferred embodiments.

BRIEF DESCRIPTION OF THE DRAWINGS

FIG. 1 is a chart of the various data channels and corresponding resolutions;

DETAILED DESCRIPTION OF THE PREFERRED EMBODIMENTS

Figure 2:
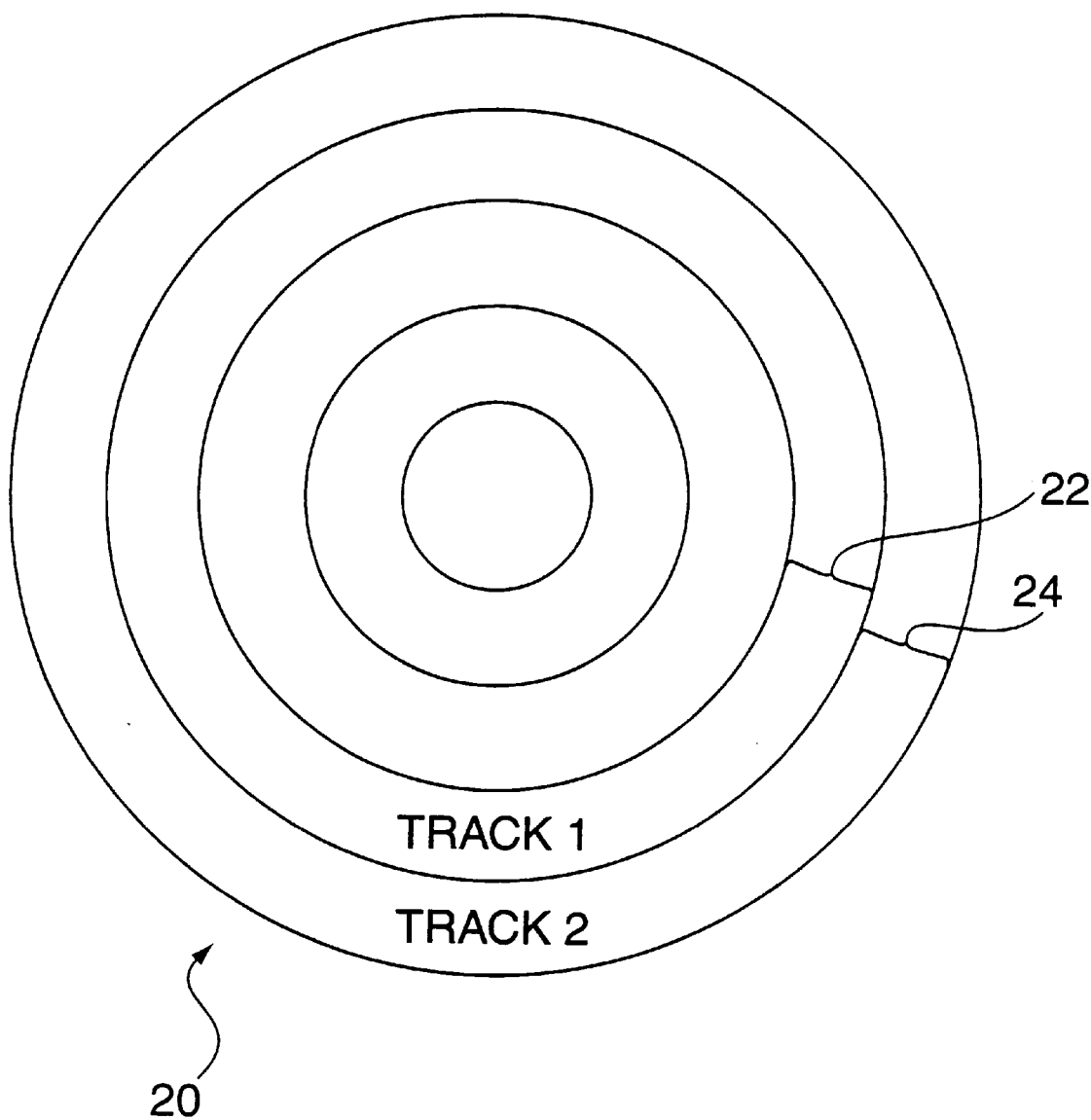
FIG. 2 is a simplified elevational view of a preferred software carrier.

As shown in FIG. 1, N channels of audio data (represented by numbers 12, 14, 16, and 18, for example) are provided on a software carrier 10 (such as DVD disc 20 in FIG. 2). N may include one or more channels. For example when N=8, there could be six channels for six-channel audio, as well as two channels for two-channel audio. Of course, there are many possible channel formats for providing audio programming on the software carrier. There can be any of K different resolutions used for the data in the various channels, where K is less than or equal to N. Each of the N channels can have its own resolution (in which case K equals N) or several channels can share the same resolution (in which case K is less than N).

There are two families of sampling rates commonly used at present in the recording industry. The first family includes rates of 48, 96, and 192 kHz. The second family includes rates of 44.1, 88.2, and 176.4 KHz. At present, the highest rates in each family (192 KHz and 176.4 KHz) are only supported in stereo, not in any other multichannel format. Both families can be used with bit depths of 16, 20 and 24 bits.

As shown in FIG. 1, different resolutions correspond to different sampling rates and/or different sample word lengths (i.e., a greater resolution means a greater sampling frequency and/or a longer sample word length).

As shown in FIG. 2, channels 1-N may be provided in multiple tracks on a software carrier such as a DVD disc 20. For example, track 1 (which may include channels 1-I (e.g., six channels for six-channel audio) is labeled 22, and track M (which may include channels J-N (e.g., two channels for two-channel audio) is labeled 24. Several channels are typically provided in a single stream in each track, so that M is less than N. For example, when N=8, I=6, and M=2, track 1 includes channels 1–6 and track 2 includes channels 7 and 8.

To enhance the listening experience beyond what is usually provided in conventional systems, the above-mentioned software carrier recording may have some of the channels sampled at a sampling rate greater than has heretofore conventionally been used. For example, in a six-channel audio system, the three front channels may be sampled at 88.2 KHz or 96 KHz, which is higher than the 44.1 or 48 KHz conventionally used as the highest sampling rate. The rear channels, which generally contain somewhat less important information, may be sampled at the more conventional 44.1 or 48 KHz sampling rate. The subwoofer channel, which contains only low frequency information and which therefore does not need a high sampling rate, may be sampled at 11.025 or 12 KHz. It is wasteful of space on the recording media to sample all six channels at 88.2 or 96 KHz when the rear and subwoofer channels do not significantly benefit from such high sampling rates.

The foregoing considerations lead to sampling the various channels to be recorded at different sampling rates. Sampling is generally performed using a sampler which includes a device such as an analog-to-digital ("A/D") converter.

At present, only a minority of consumers have multi-channel (e.g., six-channel) audio systems. Most consumers have only two-channel stereo audio systems. If recording media are provided with six-channels of audio recorded on them, it is desirable to have those media also playable in two-channel stereo audio systems. It is then further desirable to have playback apparatus for six-channel media which can optionally derive conventional two-channel stereo signals from the six channels of recorded information. In this way the six-channel recording media and the associated playback apparatus can be used in either six-channel or two-channel audio systems.

Figure 3:
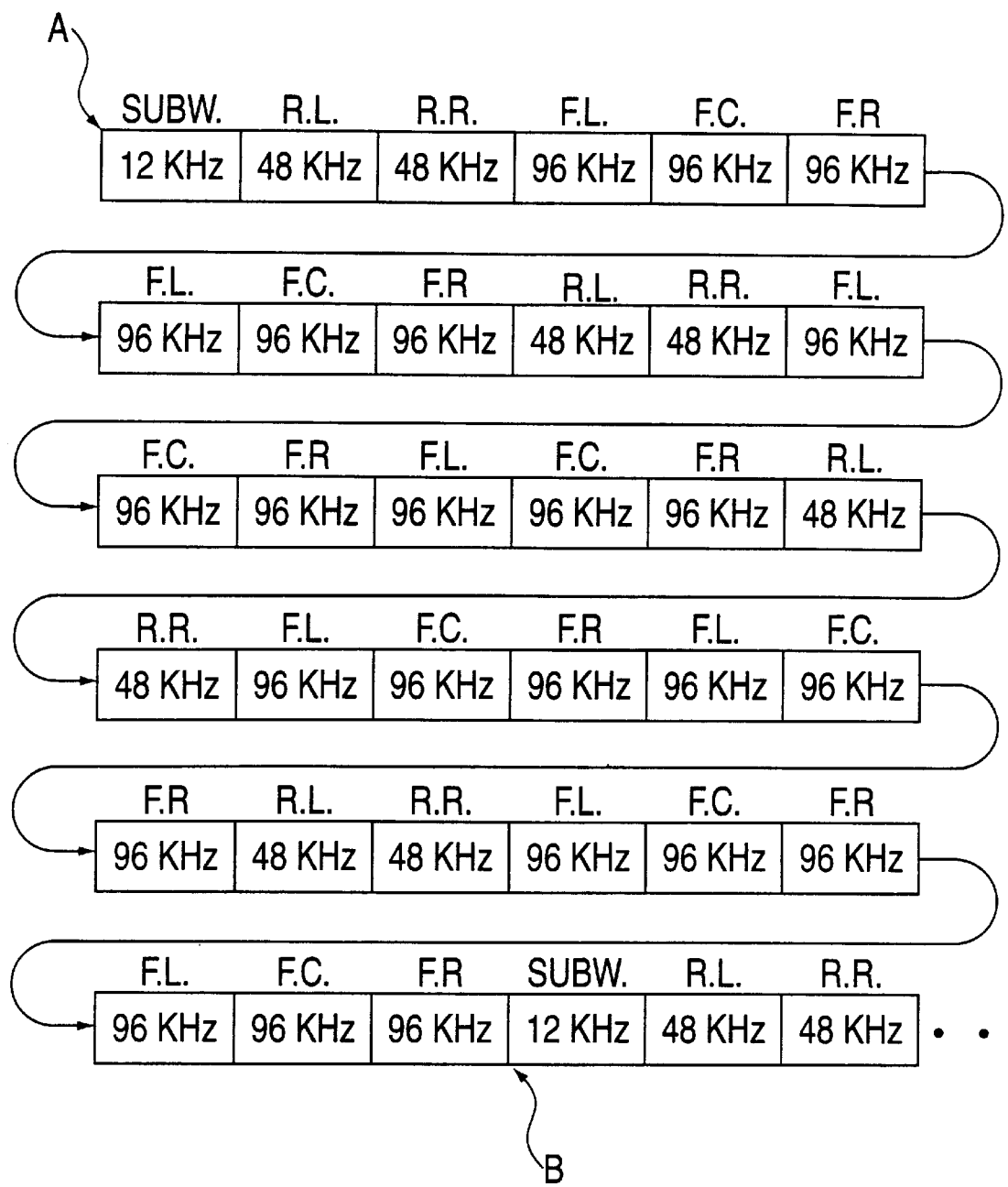
FIG. 3 is a chart showing a preferred order of recording samples on DVD-type six-channel recording media.

Assuming that the subwoofer channel ("SUBW.") is sampled at 12 KHz, that the rear left ("R.L.") and rear right ("R.R.") channels are sampled at 48 KHz, and that the front left ("F.L."), front center ("F.C."), and front right ("F.R.") channels are sampled at 96 KHz, FIG. 3 shows a preferred order of recording samples on DVD-type six-channel recording media. The samples between points A and B (points A and B define a frame, i.e., a distance or time interval successive samples of the lowest frequency) are all taken from one time interval in the original information and include one 12 KHz subwoofer channel sample, four 48 KHz rear left samples, four 48 KHz rear right samples, eight 96 KHz front left samples, eight 96 KHz front center samples, and eight 96 KHz front right samples. The preferred recording order for these samples shown in FIG. 3 is such that the samples are read out one after another from left to right and from top to bottom as viewed in FIG. 3. Thus the recording order is preferably such that the first sample read out (at point A) is a lowest frequency sample. The next samples read out are intermediate frequency samples. The next samples read out are highest frequency samples. Then more intermediate frequency samples are read out, followed by more highest frequency samples. This pattern continues until it is time (at point B) to read out another of the lowest frequency samples, and then the whole pattern repeats again.

The above-described recording order (and consequent reading out order) provides samples from the recording media in most nearly the order in which they are needed by the playback circuitry (including the circuitry needed to derive two-channel stereo from six-channel recorded information). This will be more apparent from the following description of illustrative playback circuitry.

Figure 4:
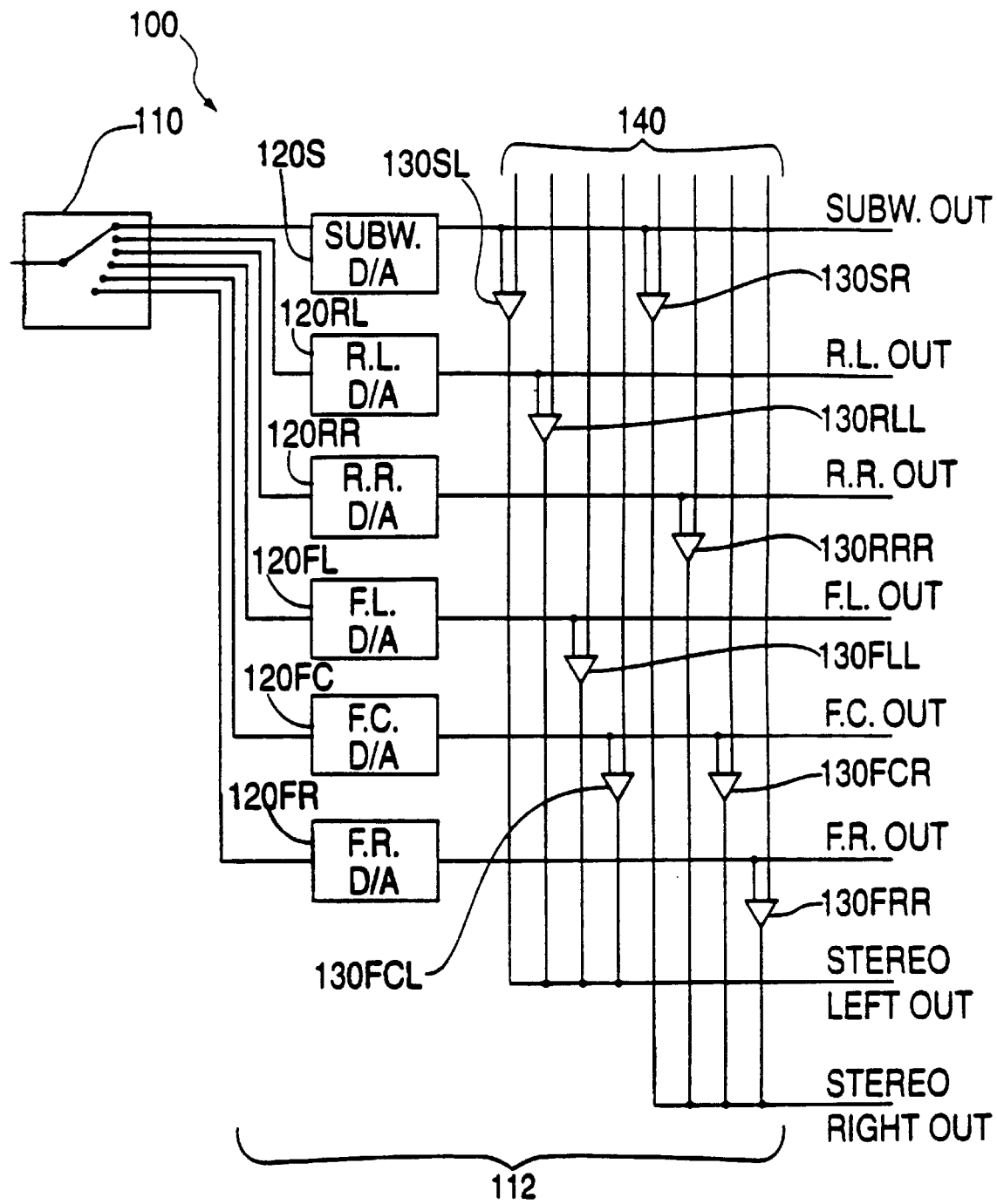
FIG. 4 is a simplified schematic block diagram of an illustrative playback circuit.

In the illustrative playback circuit 100 shown in FIG. 4 the samples read from the DVD-type disc are supplied one after another to the left-hand terminal of demultiplexer 110. Demultiplexer 110 switches each successive sample into the correct one of the six output channels of conversion unit 112. For example, each subwoofer channel sample is switched into the subwoofer channel which includes subwoofer channel digital-to-analog ("D/A") converter 120S. This D/A converter converts the samples it receives to an analog subwoofer channel output signal ("SUBW. OUT"). Similarly, demultiplexer 110 applies each rear left channel sample to rear left channel D/A converter 120RL which produces an analog rear left channel output signal ("R.L. OUT"). Each rear right channel sample is similarly applied to rear right channel D/A converter 12ORR. And each of the front left, front center, front right channel samples are similarly applied to D/A converters 120FL, 120FC, and 120FR, respectively. Thus the top six outputs shown in the right in FIG. 4 are six analog signals for use in a six-channel audio system.

FIG. 4 also shows how the left and right two-channel stereo outputs may be derived from the six-channel signals. The left stereo output signal ("STEREO LEFT OUT") is produced by appropriately weighting each of the SUBW. OUT signal, the R.L. OUT signal, the F.L. OUT signal, and the F.C. OUT signal and combining the resulting signals. Operational amplifiers 130SL, 130RLL, 130FLL, and 130FCL are respectively used to weight these signals for combination to produce the STEREO LEFT OUT signal. Similarly, the right stereo output signal is produced by appropriately weighting each of the SUBW. OUT signal, the R.R. OUT signal, the F.C. OUT signal, and the F.R. OUT signal (using operational amplifiers 130SR, 13ORRR, 130FCR, and 130FRR, respectively) and combining the resulting signals. The weighting factors (which may be provided on the software carrier or by user input) used by operational amplifiers 130 are supplied via leads 140.

Figure 5:
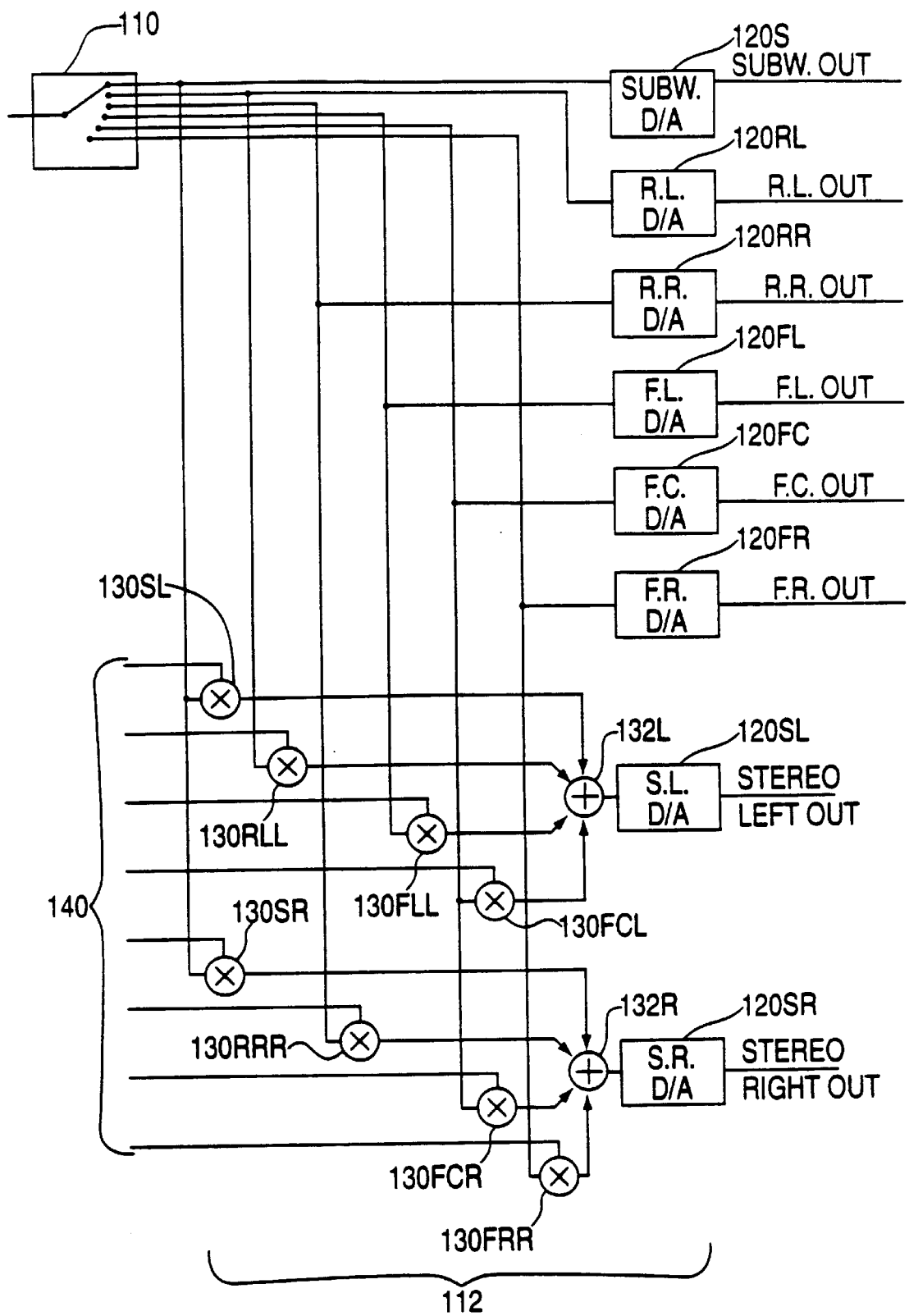
FIG. 5 is a simplified schematic block diagram of another illustrative playback circuit.

FIG. 5 shows an alternative embodiment of conversion unit 112 of FIG. 4 in which the two-channel stereo signals are derived from the six-channel audio signals in the digital domain (rather than in the analog domain as is done in FIG. 4). In FIG. 5 elements 130 are digital multipliers for multiplying successive samples from demultiplexer 110 by various appropriate digital weighting factors supplied via leads 140. Elements 132L and 132R are digital adders for combining the multiplier 130 outputs that contribute to the left and right stereo channels, respectively. D/A converters 120SL and 120SR respectively convert the digital outputs of adders 132L and 132R to the analog left and right stereo output signals. In all other respects FIG. 5 is similar to FIG. 4. Note that in order for each adder 132 to receive something from each associated multiplier 130 during each operating cycle of the adder, some of the multipliers 130 may recycle and reuse the inputs they receive from demultiplexer 110 until the next new sample comes from demultiplexer 110 for that multiplier.

It will be apparent from studying FIGS. 3 and 4 together or FIGS. 3 and 5 together that the recording and consequent playback order for samples shown in FIG. 3 produces samples from the recording media in the order which comes closest to the order in which those samples are needed by the D/A converters 120 in the various channels in FIG. 4, or by the corresponding D/A converters 120 and digital components 130 and 132 in FIG. 5. This order of the samples therefore minimizes the amount of buffering needed in the various D/A converters and digital components to resynchronize the data across the various channels and to even out the rate of the samples in each channel.

It will be understood that the various sample rates mentioned above are only illustrative, and that different sample rates (e.g., 88.2, 44.1, and 11.025 KHz) can be used if desired. Similarly, the number of different sample rates can be different from three, and the number of channels sampled at each sample rate can be different from the number of channels sampled at each rate in the illustrative embodiment described above.

Figure 6:
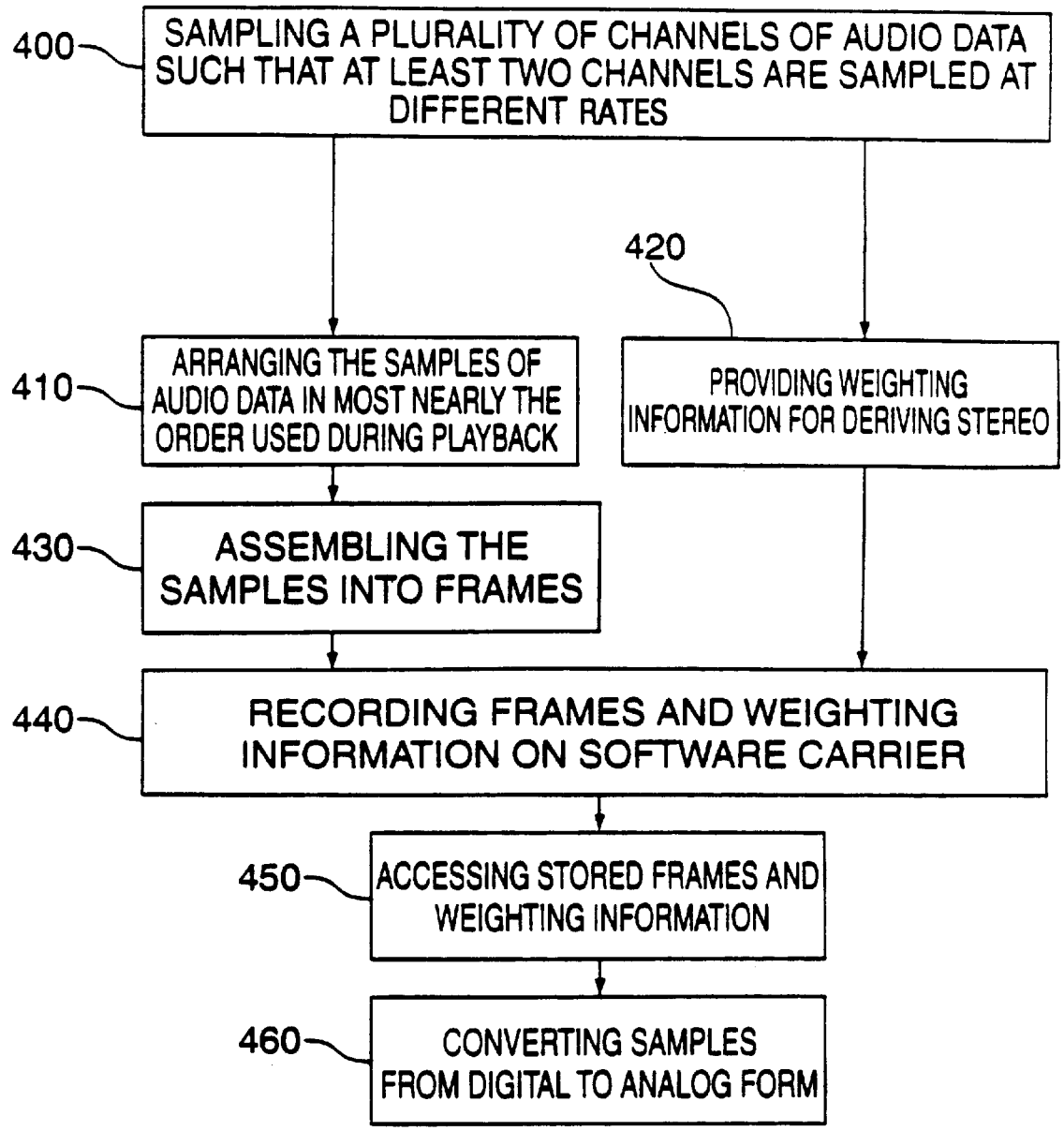
FIG. 6 is a flowchart of a preferred method of recording and playback.

A flowchart illustrating a method for recording and playing back multi-channel digital audio signal samples taken at different sampling rates is provided in FIG. 6. A plurality of channels of audio data are sampled in step 400 such that at least two channels of the plurality of channels are sampled at different rates. The samples of the plurality of channels of audio data are arranged in step 410 in most nearly the order needed during playback. The samples of the plurality of channels of audio data are assembled in step 430 into frames. Weighting information for deriving stereo is optionally provided in step 420. The frames and weighting information are recorded in step 440 on the software carrier. The frames and weighting information stored on the software carrier are accessed in step 450. The samples of audio data are converted in step 460 from digital to analog form.

It will be understood that the foregoing is only illustrative of the principles of this invention, and that various modifications can be made by those skilled in the art without departing from the scope and spirit of the invention.

What is claimed is:

1. A method for recording multi-channel digital audio signal samples comprising:
   generating said samples by sampling a plurality of channels of audio signals such that at least three channels of said plurality of channels are sampled at different rates; and
   arranging said samples of said plurality of channels of audio signals in series on a software carrier in most nearly the order needed during playback.

2. The method of claim 1 further comprising:
   providing weighting information for deriving two-channel stereo from said plurality of channels of audio signals.

3. The method of claim 1 or 2 wherein:
   said arranging includes assembling said samples into frames wherein each frame defines an interval between two sequential samples of the lowest frequency; and
   said generating includes sampling a plurality of channels of audio signals such that for each of said plurality of channels the number of said samples divided by the sampling rate is a constant.

4. A method for playing back recorded multi-channel digital audio signal samples taken at different sampling rates comprising:
   accessing a plurality of channels of audio signals wherein at least three channels of said plurality of channels were sampled at different rates, said samples of said plurality of channels of audio signals having been arranged in series on a software carrier in most nearly the order needed during playback; and
   converting said samples from digital to analog form.

5. The method of claim 4 wherein said converting further comprises:
   deriving two-channel stereo from said plurality of channels of audio signals by weighting said samples of said plurality of channels of audio signals.

6. The method of claim 4 wherein said converting further comprises:
   deriving two-channel stereo from said plurality of channels of audio signals by weighting said samples of said plurality of channels of audio signals before said converting.

7. A method for recording and playing back multi-channel digital audio signal samples comprising:
   generating said samples by sampling a plurality of channels of audio signals such that at least three channels of said plurality of channels are sampled at different rates;
   arranging said samples of said plurality of channels of audio signals on a software carrier in most nearly the order needed during playback;
   accessing said samples of said plurality of channels of audio signals; and
   converting said samples from digital to analog form.

8. The method of claim 7 further comprising:
   providing weighting information for deriving two-channel stereo from said plurality of channels of audio signals.

9. The method of claim 7 or 8 wherein:
   said arranging includes assembling said samples into frames wherein each frame defines an interval between two sequential samples of the lowest frequency.

10. The method of claim 7 or 8 wherein said converting further comprises:
    deriving two-channel stereo from said plurality of channels of audio signals by weighting said samples of said plurality of channels of audio signals.

11. The method of claim 7 or 8 wherein said converting further comprises:
    deriving two-channel stereo from said plurality of channels of audio signals by weighting said samples of said plurality of channels of audio signals before said converting.

12. A device for playing back recorded multi-channel digital audio signal samples comprising:
    a demultiplexer for accessing a plurality of channels of audio signals provided on a software carrier, wherein at least three channels of said plurality of channels were sampled at different rates, said samples of said plurality of channels of audio signals having been arranged in most nearly the order needed during playback; and
    a conversion unit including a plurality of digital-to-analog converters each arranged to receive one of said plurality of channels and convert said samples from digital to analog form.

13. The device of claim 12 wherein said conversion unit further comprises:
    a plurality of operational amplifiers coupled to selected outputs of said plurality of digital-to-analog converters for deriving two-channel stereo from said plurality of channels of audio signals by weighting said samples of said plurality of channels of audio signals.

14. The device of claim 12 wherein said conversion unit further comprises:
    a plurality of digital multipliers coupled to selected output leads of said demultiplexer for multiplying successive samples by various appropriate digital weighting factors; and
    a plurality of digital adders for selectively combining the outputs of said plurality of digital multipliers, the outputs of said plurality of digital adders coupled to selected inputs of said plurality of digital-to-analog converters for deriving two-channel stereo from said plurality of channels of audio signals.

* * * * *